US010595250B2

(12) United States Patent
Keller et al.

(10) Patent No.: US 10,595,250 B2
(45) Date of Patent: Mar. 17, 2020

(54) QUALITY OF SERVICE INITIATED HANDOVER (71) Applicant: Telefonaktiebolaget LM Ericsson (publ), Stockholm (SE)

(72) Inventors: Ralf Keller, Würselen (DE); Afshin Abtin, Sollentuna (SE); Patrik Dannebro, Hisings Kärra (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 113 days.

(21) Appl. No.: 15/539,769

(22) PCT Filed: Jun. 13, 2017

(86) PCT No.: PCT/EP2017/064418
§ 371 (c)(1),
(2) Date: Jun. 26, 2017

(87) PCT Pub. No.: WO2018/228678
PCT Pub. Date: Dec. 20, 2018

(65) Prior Publication Data
US 2018/0359672 A1 Dec. 13, 2018

(51) Int. Cl.
*H04W 36/14* (2009.01)
*H04W 36/22* (2009.01)
(Continued)

(52) U.S. Cl.
CPC ........... *H04W 36/14* (2013.01); *H04L 67/141* (2013.01); *H04W 36/0022* (2013.01);
(Continued)

(58) Field of Classification Search
CPC .................................................... H04L 67/141
See application file for complete search history.

(56) References Cited

U.S. PATENT DOCUMENTS

2005/0181794 A1* 8/2005 Rajkotia ............... H04W 36/24
455/436
2009/0296660 A1* 12/2009 Weng ................ H04W 36/0022
370/332
(Continued)

FOREIGN PATENT DOCUMENTS

WO 0044189 A1 7/2000
WO 2016004968 A1 1/2016

OTHER PUBLICATIONS

3rd Generation Partnership Project, "3rd Generation Partnership Project; Technical Specification Group Services and System Aspects; System Architecture for the 5G System; Stage 2 (Release 15)," 3GPP TS 23.510 v0.5.0, Technical Specification, May 1, 2017, Sophia Antipolis, France.

(Continued)

*Primary Examiner* — Jamal Javaid
(74) *Attorney, Agent, or Firm* — Coats & Bennett, PLLC (57) ABSTRACT The application relates to a method for operating a first radio access node 100 of a first packet switched mobile communications network. The first radio access node receives a request for establishing a data packet session requiring a defined quality of service and determines that the data packet session cannot be handled by the first packet switched communications network. The first radio access node triggers a hand over to a second packet switched mobile communications network based on the determining and transmits an indication towards a mobile entity (200) involved in the data packet session indicating that a resource for the data packet session will be available when the handover is completed.

26 Claims, 7 Drawing Sheets (51) Int. Cl.
  *H04L 29/08* (2006.01)
  *H04W 36/00* (2009.01)
  *H04W 84/04* (2009.01)
(52) U.S. Cl.
  CPC ....... *H04W 36/0072* (2013.01); *H04W 36/22* (2013.01); *H04W 36/0066* (2013.01); *H04W 84/042* (2013.01)

(56) References Cited

U.S. PATENT DOCUMENTS

| | | | |
|---|---|---|---|
| 2011/0235580 A1 | 9/2011 | Kanauchi et al. | |
| 2015/0215346 A1* | 7/2015 | Kotecha | H04L 67/141 709/227 |
| 2017/0078938 A1* | 3/2017 | Pitkamaki | H04W 36/14 |

OTHER PUBLICATIONS

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401 v14.1.0, Technical Specification, Sep. 1, 2016, Sophia Antipolis, France.

3rd Generation Partnership Project, "3rd Generation Partnership Project; Technical Specification Group Services and System Aspects; Procedures for the 5G System; Stage 2 (Release 15)," 3GPP TS 23.502 v0.4.0, Technical Specification, May 1, 2017, Sophia Antipolis, France.

Nokia, et al., "TS 23.501: Voice and Emergency session support for 5G," SA WG2 Meeting #121, Agenda Item: 6.5.8.1, S2-173417, May 15, 2017, Hangzhou, China.

3rd Generation Partnership Project, "3rd Generation Partnership Project; Technical Specification Group Services and System Aspects; System Architecture for the 5G System; Stage 2 (Release 15)," 3GPP TS 23.501 v0.5.0, Technical Specification, May 1, 2017, Sophia Antipolis, France.

3rd Generation Partnership Project, "3rd Generation Partnership Project; Technical Specification Group Radio Access Network; NG Radio Access Network (NG-RAN); NG Application Protocol (NGAP) (Release 15)," 3GPP TS 38.413 v0.1.0, Technical Specification, May 1, 2017, Sophia Antipolis, France, pp. 1-80.

* cited by examiner

QUALITY OF SERVICE INITIATED HANDOVER

TECHNICAL FIELD

The present application relates to a method for operating a first radio access node in a first packet switched mobile communications network and to a method for operating a mobile entity. The application furthermore relates to the corresponding first radio access node and the corresponding mobile entity. Furthermore, a system comprising the radio access node and the mobile entity is provided together with a computer readable storage medium.

BACKGROUND

Figure 1:
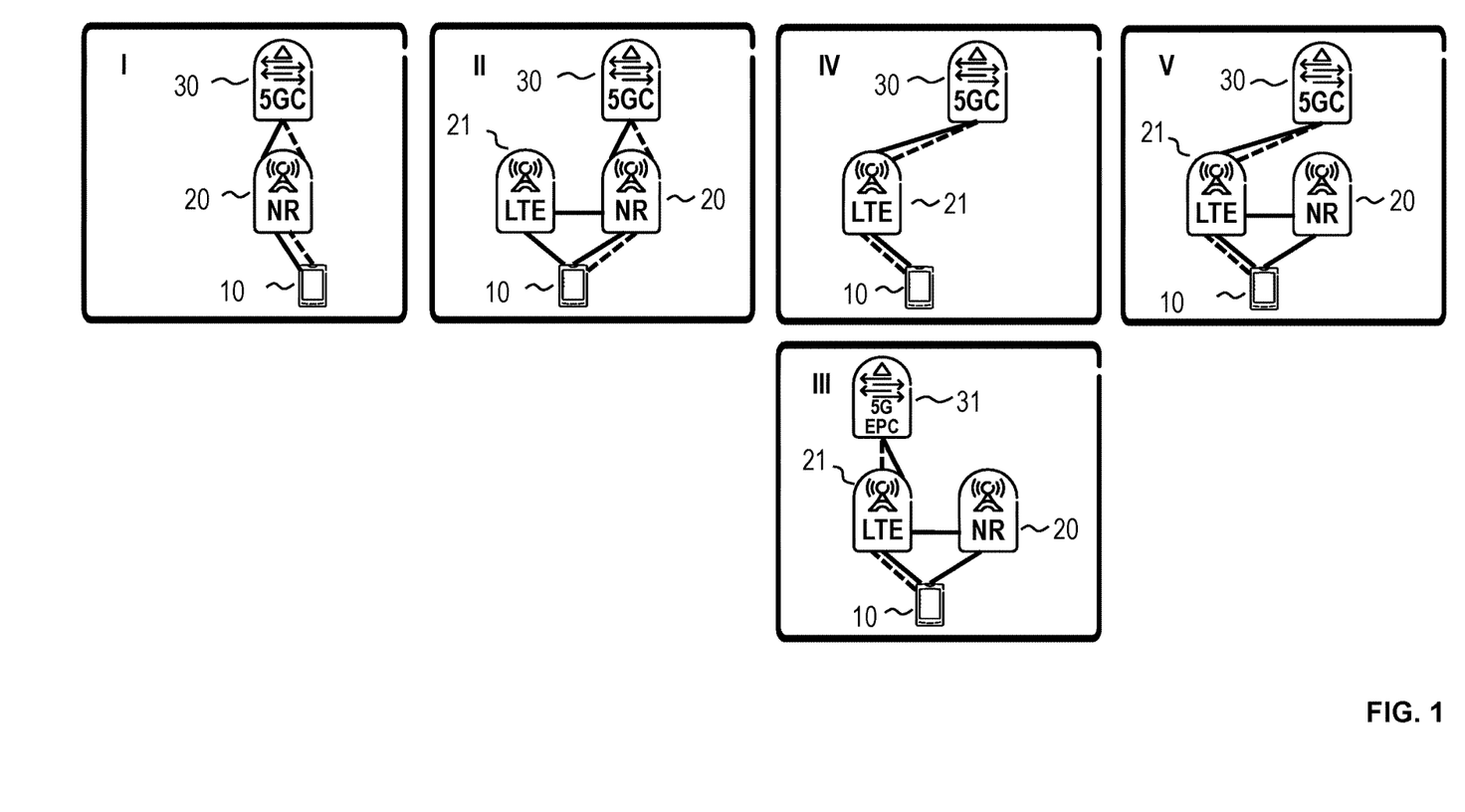
FIG. 1 shows different example scenarios how a mobile entity is connected to different packet switched communications networks as known in the art.

LTE standing for Long Term Evaluation is a currently used IP-based or packet switched radio access network of a mobile telecommunications network. The LTE network part is also called 4G radio access network as it followed a 3G network and provided a higher capacity and data rates compared to the 3G network. The 4G network comprises a 4G core network, the Evolved Packet Core, EPC, and the 4G radio access network, LTE, wherein LTE and EPC together form the Evolved Packet System, EPS. Currently the next generation of the mobile communications network is developed under the name 5G network with a 5G core network (5GC) and a new radio access network, also called new radio (NR). FIG. 1 shows different scenarios how these two networks may interact. In the scenario I a mobile entity 10 is only operating in the 5G network so that it is connected to a radio access node 20 of the 5G network and to a core network entity 30 of the 5G network. Scenario II is called "new radio assisted" scenario in which the mobile entity 10 registers via the radio access node 20 of the 5G network, however, the mobile entity is also connected to the LTE radio access node 21 and both access networks can be used for the user plane as indicated by the straight line connecting the mobile entity 10 to both radio access nodes. In the third scenario shown, the situation is similar compared to scenario 2, here the mobile entity 10 is connected via the LTE radio access node 21 to a 5G enabled core network node 31 of the 4G network, called the 5G enabled EPC (Evolved Packet Core).

In scenario IV the mobile entity 10 is connected via the LTE radio access node 21 to the 5G core network node 30 and in scenario V, which is called LTE assisted system the mobile entity registers via the LTE radio access node 21 to the 5G core network but both radio access nodes 20, 21 can be used for the user plane.

Another scenario not shown is the case where the mobile entity 10 is only operating in the LTE network and is thus connected to the LTE radio access node 21 which is connected to the evolved packet core of the network.

As can be deduced from the scenarios discussed above the LTE radio access node and the 5G radio access node can be connected to the 5G core network or 5G EPC. The LTE radio access node will also be connected to the evolved packet core partly to serve mobile entities, also called UEs (user equipments) hereinafter, but also mobile entities operating in the 5G network can use scenario 3 mentioned above were the new radio access node 20 is anchored in the evolved packet core and is supported as an additional data carrier to LTE.

Especially at the beginning of a deployment of a new network it cannot be always assured that data packet sessions requiring a certain quality of service such as a real-time data packet session for a voice or video call can be handled by the new network. In other situations the 4G or LTE network may not be able to provide the required quality of service or the required resources for such a call.

In current situations it is not possible that a mobile entity uses the IMS (IP multimedia subsystem) over a 5G radio access network which is connected to a 5G core network wherein the 5G radio access network does not support the required quality of service for the call. Hence, in deployments where LTE is providing the wider area coverage overlapping with 5G radio access network then also the 5G radio access network should support the required quality of service for a voice call or video call even though the voice service could be handled by the other of the two networks, here the LTE network. The lack of voice support in the 5G radio access network and 5G core network could imply that a voice centric mobile entity will always camp on LTE.

SUMMARY

Accordingly, a need exists to improve the interworking between the two mobile communications networks and to allow scenarios which are currently not possible, e.g. a scenario in which the mobile entity uses the 4G radio access network connected to EPC network for voice service when the mobile entity is camping on a 5G radio access network and a 5G core network or vice versa to use the 5G radio access and 5G core network for voice service when the mobile entity is camping on the 4G radio access network connected to EPC network.

This need is met by the features of the independent claims. Further aspects are described in the dependent claims.

According to a first aspect a method for operating a first radio access node of a first packet switched mobile telecommunications network is provided. In the method a request for establishing a data packet session for a mobile entity is received requiring a defined quality of service. Furthermore, it is determined that the real-time data packet session cannot be handled by the first packet switched telecommunications network. A handover to a second packet switched mobile telecommunications network is triggered based on the determining and an indication is transmitted towards the mobile entity involved in the data packet session indicating that a resource for the data packet session will be available when the handover is completed.

With the above described method it is possible that the data packet session is handled by the other of the two packet switched mobile telecommunications networks when the required quality of service, e.g. a guaranteed bit rate or a required minimum delay, cannot be provided by the first network to which the mobile entity is currently connected. The first packet switched mobile telecommunications network can be the 5G network and the second packet switched mobile communications network can be the 4G network, however, the situation may also occur vice versa so that the first network is a 4G network and the second network is a 5G network. The indication can indicate that the resource is not yet available and will only be available when the handover is completed. The mobile entity receiving the indication is informed that a delay in the resource setup has to be expected and should not be considered as a setup failure.

The data packet session may be a real-time data packet session provided for a mobile entity terminating a mobile entity originated call, be it a voice call or video call. Accordingly, the mobile entity can camp on one of the radio networks if there is no voice or video call going on and can fall back to the other network in case of a voice or video call when the current network where the mobile entity is currently camping on does not have the resources to handle the data packet session for which the required quality of services is necessary.

Furthermore, the corresponding radio access node is provided which is located in the first packet switched mobile communications network wherein the first radio access node comprises a memory and at least one processor wherein the memory contains instructions executable by the at least one processor wherein the first radio access node is operative to operate as discussed above or as disclosed in more detail below.

Alternatively, a first radio access node is provided comprising a first module configured to receive a request for establishing a data packet session requiring a defined quality of service. A second module of the first radio access node is configured to determine that the data packet session cannot be handled by the first packet switched communications network. A third module is configured to trigger a handover to a second packet switched mobile communications network based on the determining and a fourth module is configured to transmit an indication towards the mobile entity involved in the data packet session indicating that a resource for the data packet session will be available when the handover is completed.

Additionally, a method for operating a mobile entity is provided wherein the mobile entity connects to a first packet switched mobile communications network and determines that a data packet session requiring a defined quality of service should be started. An indication is received indicating that a resource for the data packet session is not available in the first packet switched mobile communications network, but will be available when a handover from the first packet switched mobile communications network to a second packet switched mobile communications network is completed. The mobile entity then sets up the data packet session based on the indication with the assumption that the resource will be available when a handover from the first packet switched mobile communications network to a second packet switched mobile communications network is completed.

With the above method the mobile entity is still able to support the data packet session even when the network on which the mobile entity is currently camping is not able to handle the data packet session with the required quality of service. With the above described method the data packet session can nevertheless be started as the mobile entity is informed about the fact that a handover is taking place before the mobile entity can continue with the setup of the data packet session assuming that the resources will be available once the handover is completed. Accordingly, the mobile entity knows that a certain delay in the setup of the data packet session will occur so that a delay is expected and not considered as a setup failure.

Furthermore, the corresponding mobile entity is provided comprising a memory and at least one processor, the memory containing instructions executable by the at least one processor wherein the mobile entity is operative to function as discussed above or as described in further detail below.

As an alternative, a mobile entity is provided which comprises a first module configured to connect to a first packet switched mobile communications network. A second module of the mobile entity is configured to determine that the data packet session requiring a defined quality of service should be started wherein a third module receives an indication indicating that a resource for the data packet session is not available in the first packet switched mobile communications network, but will be available when a handover from the first packet switched communications network to the second packet switched mobile communications network has been completed. A fourth module of the mobile entity is configured to set up the data packet session based on the indication under the assumption that the resource will be available when the handover from the first packet switched mobile communications network to the second packet switched mobile communications network is completed.

Additionally, a system is provided comprising the mobile entity and the radio access node as discussed above. Furthermore, a computer program comprising a program code to be executed by at least one processor of the first radio access node or the mobile entity is provided wherein execution of the program code causes the at least one processor to execute a method discussed above or discussed in further detail below.

Additionally, a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present application. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

In the following, embodiments of the application will be described in detail with reference to the accompanying drawings. It is to be understood that the following description of embodiments is not to be taken in a limiting sense. The scope of the application is not intended to be limited by the embodiments described hereinafter or by the drawings, which are to be illustrative only.

The drawings are to be regarded as being schematic representations, and elements illustrated in the drawings are not necessarily shown to scale. Rather the various elements are represented such that their function and general-purpose becomes apparent to a person skilled in the art. Any connection or coupling between functional blocks, devices or components of a physical or functional unit shown in the drawings and described hereinafter may also be implemented by an indirect connection or coupling. A coupling between components may be established over a wired or wireless connection. Functional blocks may be implemented in hardware, software, firmware, or a combination thereof.

With the context of the present application, the term mobile entity or user equipment, UE, refers to a device used by a person or a user for his or her personal communication. It can be a telephone type of device, for example of a telephone or a session initiation protocol (SIP) or voiceover internet protocol phone, cellular telephone, a mobile station, cordless phone, or a personal digital assistant type of device like laptop, notebook, notepad, tablet equipped with a wireless data connection et cetera. The mobile entity may also be associated with nonhumans like animals, plants or machines. A mobile entity may be equipped with a UICC (Universal Integrated Circuit Card) including an Universal Subscriber Identity Module, USIM and an IP Multimedia Services Identity Module, ISIM or SIM (subscriber identity module) comprising unique identities such as the IMSI (International Mobile Subscriber Identity), TMSI (Temporary Mobile Subscriber Identity) or GUTI (Globally Unique Temporary UE identity) associated it with the user using the mobile entity wherein the GUTI and TMSI are allocated by the network. For the sake of clarity, it is noted that there is a difference but also a tight connection between a user and a subscriber. The user gets access to the network by acquiring a subscription to the network and by that becomes a subscriber within the network. The network then recognises the subscriber e.g. based on the IMSI or TMSI and uses the associated subscription to identify related subscriber data. The user is the actual user of the mobile entity and the user may also be the one owing the subscription, but the user and the owner of the subscription may also be different.

In the following embodiments are disclosed from a 5G radio access network and a 5G core network perspective interworking with LTE/EPC, but the following description is also applicable for an LTE/EPC network interworking with a 5G radio access network and a 5G core network.

If the radio access node in the 5G network (or in the 4G network) receives a request to establish a quality of service flow with a quality of service flow indicator, QFI, suitable for a voice call or a video call, then the 5G radio access node (or the 4G radio access node) will initiate an interradio access technology handover (IRAT) handover to 4G (5G) if the 5G radio access node (or the 4G radio access node)

does not support the required quality of service suitable for a voice media that only supports the 5QI/QFI suitable for signalling, supports 5QI/QFI suitable for voice media, but the data packet session, PDU session cannot be served as the capacity limit may be reached, in either case takes measurement reports and the radio capabilities of the mobile entity into account.

The radio access node to which the UE is currently connected may be pre-provisioned with QFI (QoS Flow Indicator) and relevant QoS characteristics for voice prior a PDU (Packet Data Unit) session is established. In such a case the radio access node should look at the QFI label on the user plane in order to execute the procedure.

Figure 2:
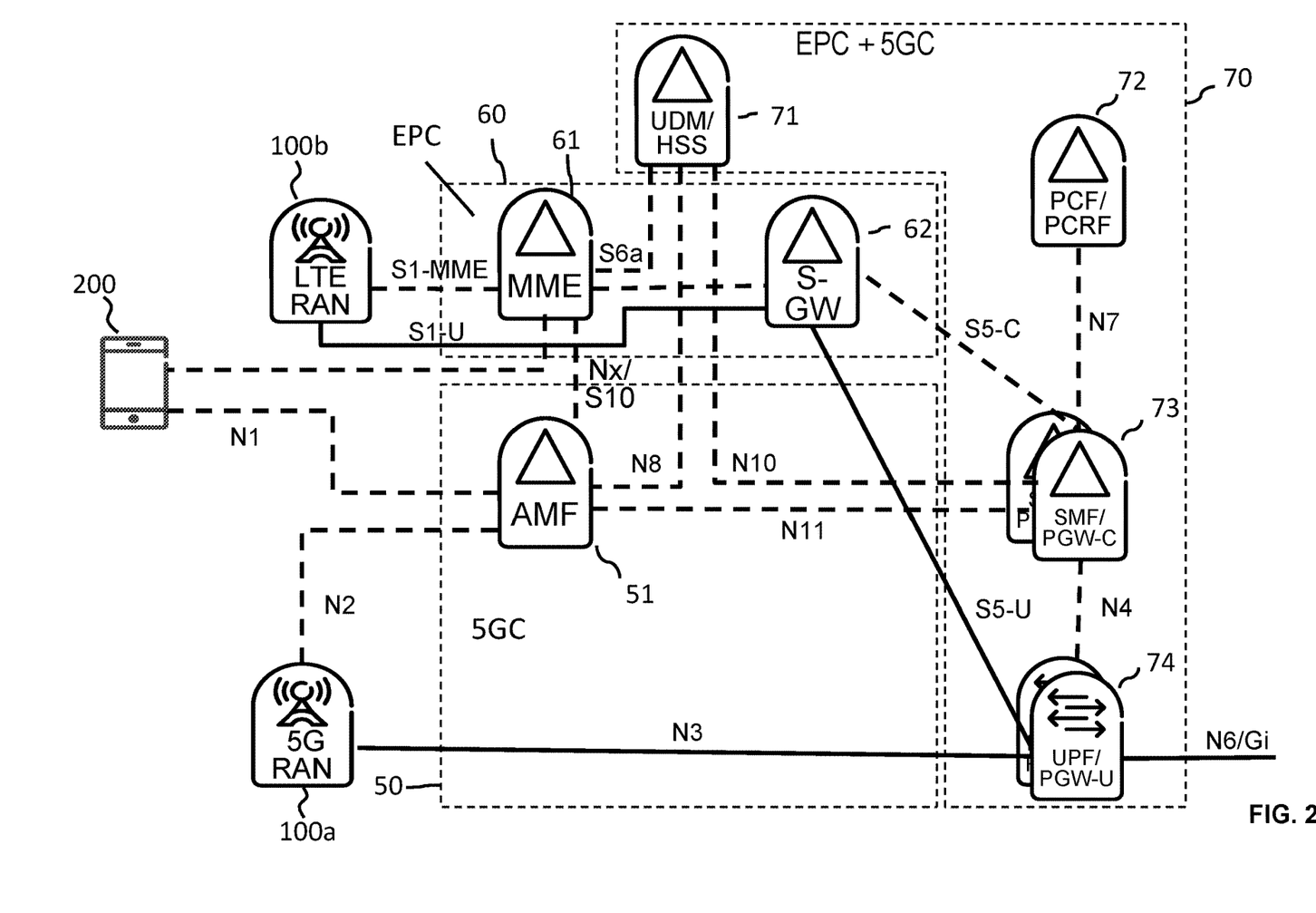
FIG. 2 shows an example schematic overview of an interworking between two packet switched mobile communications networks and a mobile entity incorporating features of the invention.

The system architecture is shown in more detail in FIG. 2. In FIG. 2 a mobile entity 200 is operating with a 4G/LTE network and a 5G network. A 5G core network 50 is provided and an LTE core network or evolved packet core 60. Furthermore, a network area 70 is provided where common functional entities are located which provide common functions to both networks. In the common section 70 the functional entities indicate in the first line the name of the 5G network and in the second line the corresponding name of the function in the LTE network. Accordingly, a home subscriber server, HSS or unified data management entity, UDM 71 is provided in the common section 70 as well as a policy and charging rules function, PCRF or a policy control function, PCF, 72. A packet gateway for control messages 73 or session management function is provided and a packet gateways 74 for user data or user plane function 74. In the 5G core network an access and mobility management function, AMF 51 is provided and in the 4G core network (EPC) 60 the mobility management entity, MME, 61 and the serving gateway 62 are provided. In case of a handover from one of the networks to the other network, the radio access node 100*a*, 100*b* to which the mobile entity is currently connected instructs the mobile entity 200 which neighbour cell to measure. The mobile entity 200 provides the measurement reports to the radio access network to which it is currently connected and then the radio access network determines whether there is a need to perform a handover to a cell of the same radio technology or to a cell of a different radio technology. Also single radio voice call continuity, SRVCC, from LTE to 2G or 3G is normally initiated by the radio access node of the LTE network based on measurement reports. In the situation and architecture discussed above the radio access node of one of the networks to which the mobile entity 200 is currently connected may determine that it cannot establish the PDU (packet data unit) session or the data packet session with the required quality of service. In this situation the radio access node 100*a*, 100*b* to which the mobile entity 200 is currently connected will initiate a handover to the other radio access technology. In this handover request message from the 5G radio access node or 4G radio access node to the AMF 51, the radio access node such as the 5G radio access node 100*a* or the LTE radio access node 100*b* may indicate that this handover is for a quality of service flow with 5QI suitable for voice being established. This indication is used for statistics, but may also be sent from AMF 51 to SMF 73 and from there to the PCRF 72. If the P-CSCF (Proxy Call Session Control Function) has subscribed to be informed about such events, then the PCF 72 will inform the P-CSCF accordingly.

From a handover perspective, the PDU session or the data packet session with 5QI, for example for voice, is treated as if the resources were already reserved in the source radio access network even though these resources are not actually reserved by the corresponding radio access node. But treating the handover as already reserved enables establishing a suitable bearer (for example a voice bearer) comprising resources in the target radio access network as part of the handover procedure, and hence the mobile entity 200 can start using this bearer for the voice or video media right after camping on the target access network. The radio access node 100a or 100b indicates to the mobile entity 200, e.g. via RRC (radio resource control) that the PDU session is being established or can be used once the handover is completed. Accordingly, the mobile entity 200 knows that the call establishment proceeds, that the radio resources are not yet available but will be available when the handover has been completed. Accordingly, the mobile entity 200 is informed that an additional delay to finally set up the call which may be a mobile originated or a mobile terminated call, may occur.

Figure 3:
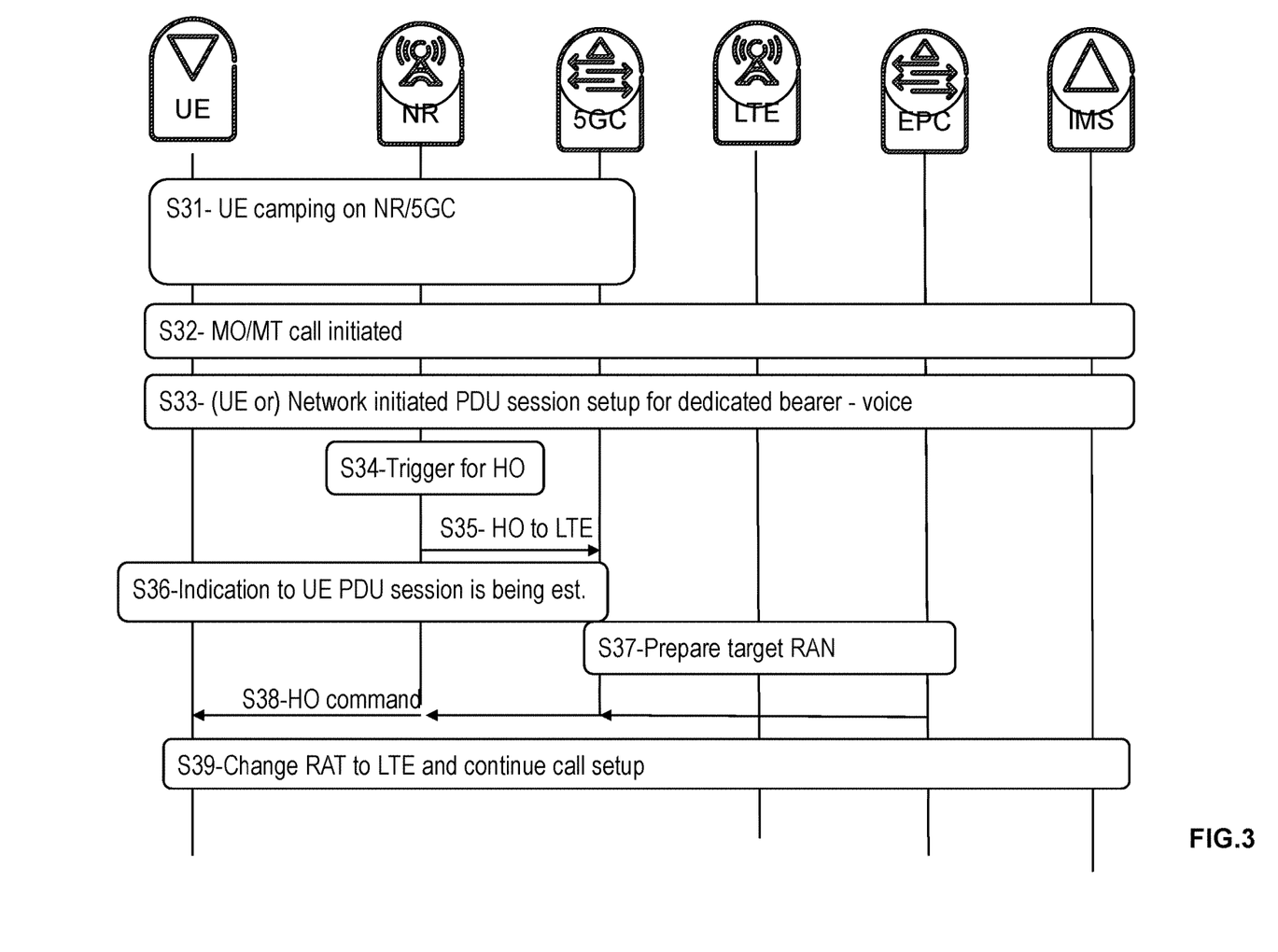
FIG. 3 shows an example message exchange between the entities involved when a call for a mobile entity is initiated when the mobile entity is connected to one of the two networks, but the call is then handled by the other of the two networks.

FIG. 3 shows a more detailed example exchange between the entities involved for such a handover. As indicated in step S31, the mobile entity 200 is camping on the 5G radio access network and 5G core network and an IMS, access point name, APN, default bearer or default PDU flow is set up. In step S32 a mobile originated or a mobile terminated call is initiated and in dependence on the fact that there is a mobile originated or mobile terminated call, there is a set up for a mobile entity or network initiated PDU session for a dedicated bearer, here a voice bearer (step S33). In step S34 the radio access node to which the mobile entity is currently connected triggers a handover as it has detected that it cannot handle the data packet session with the required quality of service. Accordingly, in step S35 a handover request for a handover to LTE is sent to the 5G core network wherein this handover optionally comprises an indication that the PDU session is being established. In step S36 the radio access node indicates to the mobile entity 200 that the PDU session is being established and resources will be available after a subsequent handover. Accordingly, the mobile entity is informed that the resources are not yet available and not yet established, but will be available once the handover is completed. In case the UE initiated the PDU session setup this message could be a PDU session establishment accept message. Alternatively, the radio access node sends an indication to the core network, e.g. via the N2 interface to the AMF 51 of FIG. 2 and the AMF 51 informs the mobile entity 200 via non-access stratum NAS. When the mobile entity 200 receives such an indication (either from the radio access node or the core network), the mobile entity can start a timer such that if the handover is not initiated before the timer expires, the call will be terminated. In step S37 the resources in the target radio access network and the bearer with the required quality of service, such as for example QCI 1 (QoS Class Identifier) to QCI 5, are prepared. In step S38 the handover command is transmitted to the mobile entity 200 and in step S39 the mobile entity changes to the other radio access network, here the LTE network and continues to set up the call on IMS level knowing that a QCI as one bearer is established.

Figure 4:
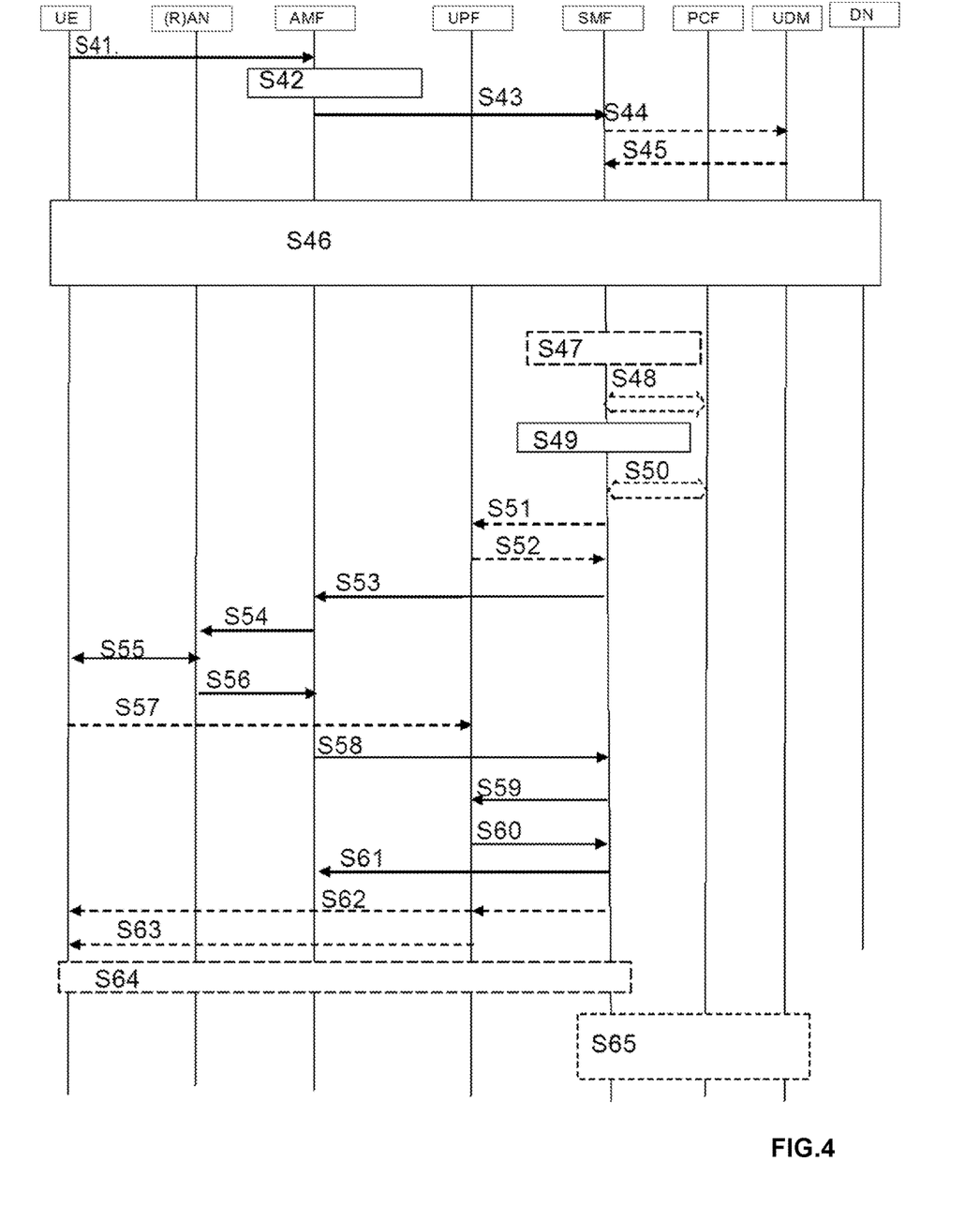
FIG. 4 shows a message exchange known in the art between different entities as shown in FIG. 3 wherein an indication about a delayed availability of resources can be included into one of the steps shown in FIG. 4.

FIG. 4 shows a message exchange as known from 3GPP 23502 version 0.3.0 which comprises a step which could be used to inform the mobile entity 200 of the indication as discussed above in step S36 of FIG. 3. The example shown discusses a mobile originating call in a non-roaming scenario and in a roaming scenario with local breakout. In the example shown it is assumed that the mobile entity has already registered on the AMF 51 so that the AMF is aware of the user subscription data from the UDM 71. In step S41 a request is sent from the mobile entity to establish a PDU session. The AMF identifies that the message is a request for a new PDU session and forwards it to a session management function, SMF. In step S43 a session management request is transmitted to the SMF. In step S44 a request for subscription data is sent to the unified data management entity, a response with the subscription data being sent back in step S45. In step S46 a PDU session authentication and authorization is carried out and in step S47 a policy control function is selected by the session management function. The SMF then initiates a PDU-CAN session establishment towards the PCF to get the default PCC rules for the PDU session. In step S49 a user plane function is selected and in step S50 a request for a PDU-CAN session is sent to the PCF, but is not established. In steps S51 and S52 a session establishment procedure is carried out with the establishment request and the establishment response. In step S53 a response is transmitted back to the AMF that the establishment of a PDU session has been accepted. In step S54 a request for a PDU session is transmitted to the radio access network. The radio access network node then determines that the data packet session (for example a real time packet data session) cannot be handled by the current network, here the 5G network. In step S55 it transmits a resource setup message to the mobile entity. This message can comprise the indication for the mobile entity that the resource for the real-time data packet session will be available when a handover is completed. Accordingly, step S55 is similar to step S36 shown in FIG. 3. In step S56 a PDU session response message is sent back so that first uplink data can be sent in step S57. In step S58 a session management request is transmitted to the SMF. In steps S59 and S60 an N4 session establishment session procedure is set up if the N4 session for the PDU session is not already established. In step S61 the session management response is sent back to the AMF. In step S62 the address configuration is carried out and first downlink data are sent in step S63. In step S64 the user plane over the source access is released, e.g. due to a handover. In step S65 the UE is registered at the serving network function. As mentioned above FIG. 4 is used to indicate one example of a message (step S55) which could piggyback the indication that resources are not yet available and will only be available after the handover is completed.

Figure 5:
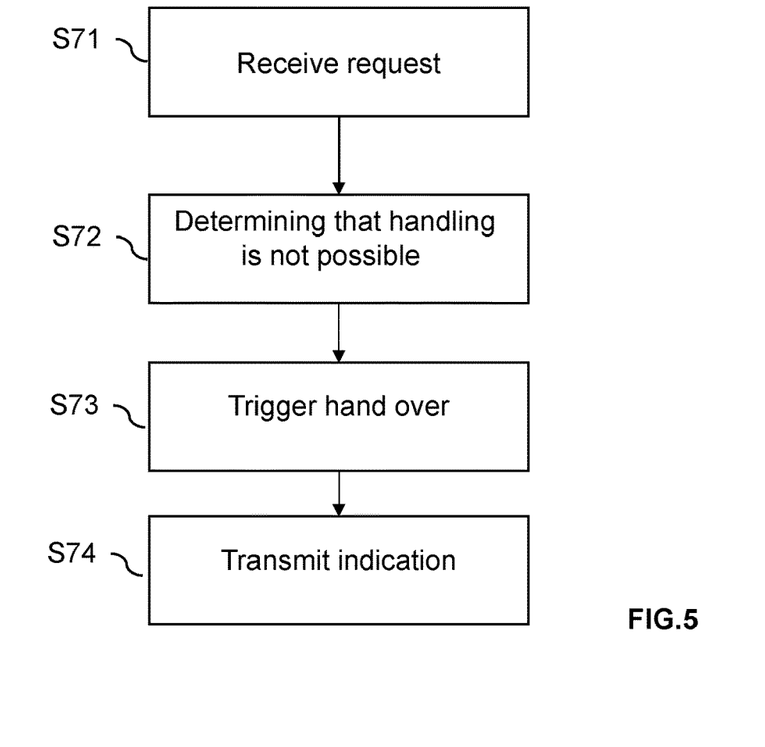
FIG. 5 shows an example flowchart of a method carried out by a first radio access node in the situation discussed in connection with FIGS. 3 and 4.

FIG. 5 summarizes some of the steps carried out by the radio access node 100 to which the mobile entity 200 is currently connected and which determines that it cannot handle the data packet session with the required quality of service. In step S71 the radio access node 100 receives the request for establishing the real-time data packet session which is part of step S32 and S33 as shown in FIG. 3 or step S54 of FIG. 4. The radio access node then determines in step S72 that the real-time data packet session cannot be handled in the current network, a step not explicitly shown in FIGS. 3 and 4, and triggers a handover to the other packet switched mobile communications network in step S73. In step S74 the mobile entity is informed with an indication that the resource for the data packet session is currently not available but will be available when the handover is completed.

Figure 6:
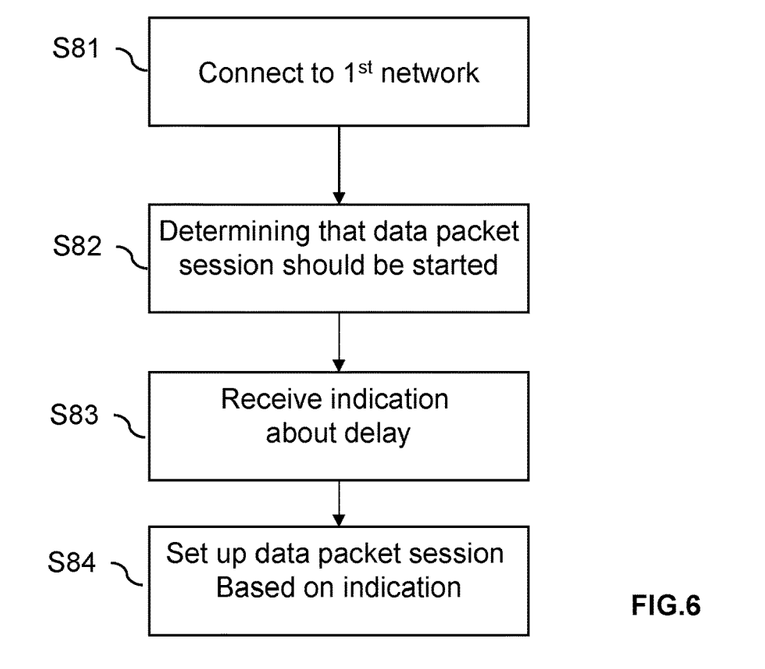
FIG. 6 shows an example flowchart of a method carried out by a mobile entity carried out in a situation discussed in connection with FIGS. 3 and 4.

FIG. 6 summarizes some of the steps carried out by the mobile entity 200 in the above described procedure. The mobile entity connects in step S81 to the first packet switched mobile communications network and either a for a mobile terminated or a mobile originated call the mobile entity determines in step S82 that the data packet session requiring a defined quality of service, especially a real-time data packet session needing a guaranteed bandwidth and a certain maximum delay should be started. The flow or bearer establishment is initiated by the network and the mobile entity 200 waits for resources being available. Thus in step S82 the mobile entity determines this initiation for the flow or bearer establishment for a real time data packet session. The mobility entity in step S83 then receives the indication transmitted from the radio access node which indicates that the resource for the data packet session is not available in the network to which the mobile entity is currently connected, but will be available when a handover from the current network to the other packet switched network is completed. In step S84 the mobile entity will continue the set up of the data packet session using the knowledge received in the indication so that the mobile entity assumes that the resource will be available when the handover is completed. In other words, the mobile entity will continue with the call setup assuming that the resource will be available once the handover to the second packed switched mobile communications network is completed.

Figure 7:
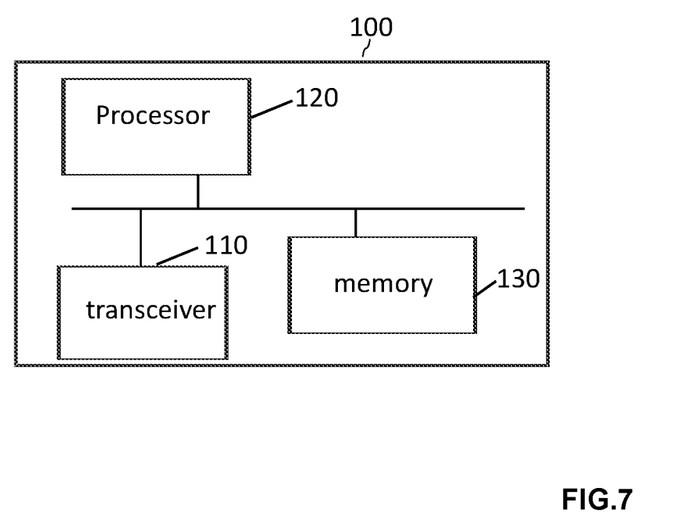
FIG. 7 shows an example schematic representation of a radio access node which transmits an indication to the mobile entity that resources will be available after the handover.

FIG. 7 shows a schematic architectural view of a radio access node 100 such as node 100a, 100b of FIG. 2 which transmits the indication towards the mobile entity 200 in which the mobile entity is informed that the resources will only be available after the handover is completed. The radio access node, which can be a radio access node of a 4G or a 5G network comprises a transceiver 110 provided for transmitting user data or control messages to other entities using a wired or wireless connection either to the mobile entity or to a core network, wherein the transceiver is furthermore used to receive user data and control messages from other entities such as the mobile entity or other entities of the corresponding core network to which the radio access node is connected. The transceiver is especially qualified to transmit the indication towards the mobile entity by which the mobile entity 200 is informed about the delay for the availability of the resources due to the handover. The radio access node 100 furthermore comprises a processor 120 which is responsible for the operation of the radio access node 100. The processor comprises one or more processing units and can carry out instructions stored on a memory 130, wherein the memory may comprise a read-only memory, a random access memory, a mass storage, a hard disk or the like. The memory 130 can furthermore include suitable program code to be executed by the processor 120 so as to implement the above described functionalities in which the radio access node 100 is involved.

Figure 8:
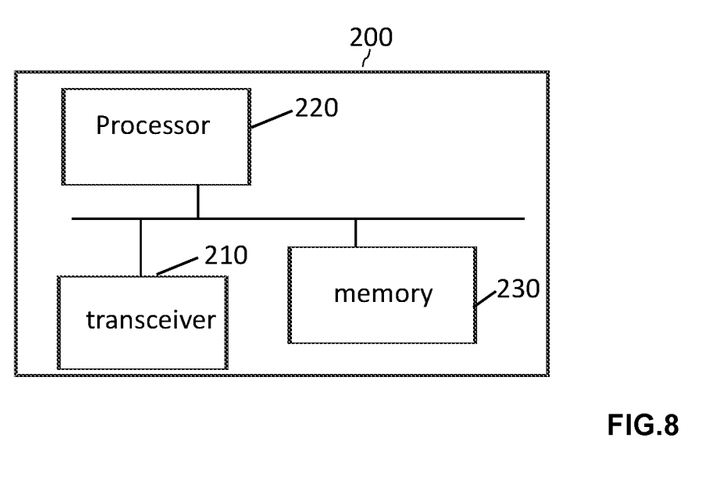
FIG. 8 shows an example schematic representation of a mobile entity receiving the indication about the handover and which is involved in the message exchange as shown in FIGS. 3 and 4.

FIG. 8 shows a schematic architectural view of the mobile entity 200 which is involved in the above discussed procedures. The mobile entity 200 comprises a transceiver 210 configured to transmit user data or control messages to other entities and configured to receive user data and control messages from other entities. The transceiver 210 is especially configured to receive the indication generated by the radio access node 100 by which the mobile entity is informed that the data packet session and the required resources will be available when the handover is completed. The mobile entity 200 furthermore comprises a processor 220 which is responsible for the operation of the entity 200. The processor 220 comprises one or more processing units and can carry out instructions stored on a memory 230, wherein the memory may include a read-only memory, a random access memory, a mask storage, a hard disk or the like. The memory can furthermore comprise suitable program code to be executed by the processor 220 so as to implement the above described functionalities in which the mobile entity 200 is involved.

It should be understood that the radio access node 100 and the mobile entity 200 may comprise further functional entities such as a human-machine interface (HMI) or input unit, a display et cetera, however, for the sake of clarity the discussion of these functional units was omitted.

Figure 9:
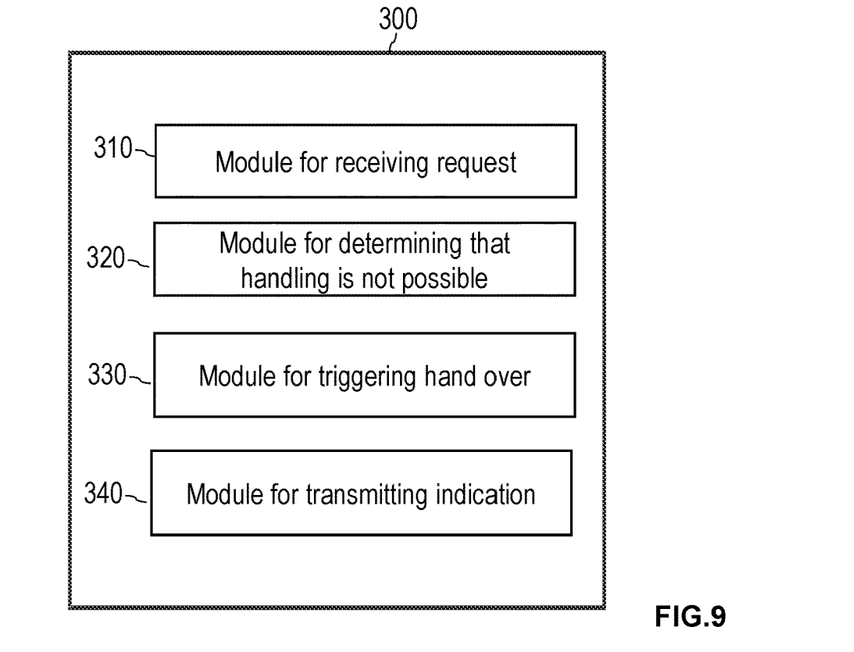
FIG. 9 shows another example schematic representation of a radio access node involved in the message exchange as discussed in FIGS. 3 and 4.

FIG. 9 shows a further schematic architectural view of a radio access node 300. Here the radio access node 300 comprises a module 310 configured to receive the request for establishing the data packet session requiring the defined quality of service (for example a real time packet data session). The radio access node 300 furthermore comprises a module 320 for determining that the data packet session cannot be handled by the current network. A module 330 is provided for triggering a handover to the second packet switched mobile communications network based on the fact that module 320 has determined that a handling is not possible. A module 340 is provided configured to transmit the indication towards the mobile entity by which the mobile entity is informed that the resource for the data packet session will be available when the handover is completed.

Figure 10:
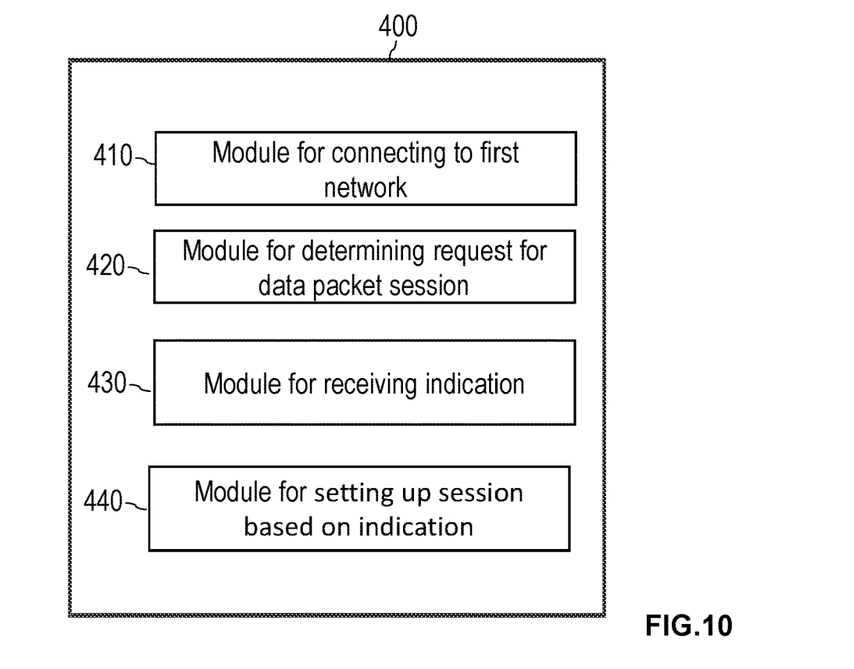
FIG. 10 shows another schematic representation example of the mobile entity involved in the message exchange as shown in FIGS. 3 and 4.

FIG. 10 shows a schematic architectural view of a mobile entity. The mobile entity 400 comprises a module 410 configured to connect to the first packet switched network. The mobile entity 400 comprises a module 420 for determining that a data packet session (for example a real time packet data session) with the defined quality of service should be started. Furthermore, a module 430 is provided which receives the indication from the radio access node 300 or 100 by which the mobile entity is informed that the resource will be available when the handover is completed. Furthermore, a module 440 is provided which sets up the data packet session based on the assumption that the resource will only be available when the handover is completed.

From the above said, some general conclusions can be drawn. As far as the radio access node of the first packet switched mobile communications network is concerned to which the mobile entity is currently connected and which determines that it cannot handle the data packet session, the first radio access node can transmit a handover request message towards the second packet switched mobile communications network wherein the handover request message comprises an information about a reason for the handover.

The reason for the handover may indicate that the handover is for a data packet flow with a quality of service suitable for voice or video call. Furthermore, the reason may indicate that the required quality of service or needed resources could not be provided by the first packet switched mobile communications network.

The data packet session in question can be a real-time data packet session provided for a mobile entity terminating or a mobile entity originating call, wherein the call can be a voice call or video call.

For the transmission of the indication towards the mobile entity 200 a resource setup request message may be transmitted to the mobile entity 200 which comprises the indication wherein the resource setup request message requests to set up radio resources for the real-time data packet session.

Furthermore, the step of transmitting the indication may comprise the step of transmitting an establishment accept message for a data packet session including the indication.

The indication about the available resources after the handover may be transmitted directly to the mobile entity 200, or it may be transmitted via a core network entity of the first packet switched mobile communications network to the mobile entity 200.

As far as the mobile entity 200 is concerned, it may set a time out in response to receiving the indication wherein the mobility entity 200 checks until the timeout occurs, whether the handover command towards the second packet switched mobile communications network is received. The mobile entity 200 can then initiate the change of the radio access technology only when the handover command is received before the timeout occurs.

When the indication is received from the radio access node 100, the mobile entity 200 may receive a resource setup message in which it is requested to set up the radio resources for the data packet session. Furthermore, it is possible that an establishment accept message for the data packet session is received including the indication.

The mobile entity 200 may receive the indication either directly from the radio access node 100 of the first packet switched network or it may receive the indication from a core network entity of the first packet switched mobile communications network and preferably independent from other indications sent by a radio access network of the first packet switched mobile communications network.

The first packet switched mobile communications network may be a 5G network and the second packet switched mobile communications network may be a 4G network. However, it is also possible that the first packet switched mobile communications network is the 4G network and the second packet switched mobile communications network is the 5G network.

Summarizing the present application enables a voice centric mobile entity to camp on one of the radio access networks and if there is no support or no capacity for the call a handover is triggered to the other packet switched network which is quality of service enabled for the voice during the call setup.

The invention claimed is:

1. A method for operating a first radio access node of a first packet switched mobile communications network, the method comprising:
   receiving a request for establishing a data packet session requiring a defined quality of service;
   determining that the data packet session cannot be handled by the first packet switched communications network;
   triggering a handover to a second packet switched mobile communications network based on the determining; and
   transmitting an indication towards a mobile entity involved in the data packet session indicating that a resource for the data packet session is currently unavailable but will be available once the handover is completed, wherein said indication is separate from a handover command associated with the handover.

2. The method according to claim 1, wherein the data packet session comprises a real time data packet session provided for a mobile entity terminating or a mobile entity originating call.

3. The method according to claim 1, wherein a handover request is transmitted towards the second packet switched mobile communications network, the handover request comprising information about a reason for the handover.

4. The method according to claim 3, wherein the reason indicates at least one of:

the handover is for a data packet flow with a quality of service suitable for a voice or video call; and
the required quality of service or the needed resources could not be provided by the first packet switched mobile communications network.

5. The method according to claim 1, wherein transmitting an indication towards the mobile entity comprises transmitting at least one of:
   a resource setup message comprising the indication towards the mobile entity requesting to set up radio resources for the data packet session; and
   an establishment accept message for a data packet session comprising the indication.

6. The method according to claim 1, wherein the indication is transmitted directly to the mobile entity or transmitted via a core network entity of the first packet switched mobile communications network to the mobile entity.

7. The method according to claim 1, wherein the first packet switched mobile communications network comprises a 5G network and the second packet switched mobile communications network comprises a 4G network or wherein the first packet switched mobile communications network comprises a 4G network and the second packet switched mobile communications network comprises a 5G network.

8. A method for operating a mobile entity, comprising:
   connecting to a first packet switched mobile communications network;
   determining that a data packet session requiring a defined quality of service should be started;
   receiving an indication indicating that a resource for the data packet session is not available in the first packet switched mobile communications network, but will be available once a handover from the first packet switched mobile communications network to a second packet switched mobile communications network is completed, said indication being separate from a handover command associated with the handover; and
   setting up the data packet session based on the indication with the assumption that the resource will be available when the handover from the first packet switched mobile communications network to the second packet switched mobile communications network is completed.

9. The method according to claim 8, further comprising setting a time out in response to receiving the indication, wherein it is checked until the timeout occurs whether a handover command towards the second packet switched mobile communications network is received, wherein the change of the radio access technology is only performed when the handover command is received before the time out occurs.

10. The method according to claim 8, wherein receiving the indication comprises at least one of:
    receiving a resource setup message requesting to set up radio resources for the data packet session; and
    receiving an establishment accept message for a data packet session comprising the indication.

11. The method according to claim 8, wherein the indication is received from:
    a radio access node of the first packet switched mobile communications network; or
    a core network entity of the first packet switched mobile communications network independent from other indications sent by a radio access network of the first packet switched mobile communications network to the mobile entity.

12. The method according to claim 8, wherein the first packet switched mobile communications network comprises a 5G network and the second packet switched mobile communications network comprises a 4G network or wherein the first packet switched mobile communications network comprises a 4G network and the second packet switched mobile communications network comprises a 5G network.

13. A first radio access node provided in a first packet switched mobile communications network, the first radio access node comprising a memory and at least one processor, the memory containing instructions executable by said at least one processor, wherein the first radio access node is operative to:
   receive a request for establishing a data packet session requiring a defined quality of service;
   determine that the data packet session cannot be handled by the first packet switched communications network;
   trigger a handover to a second packet switched mobile communications network based on the determining; and
   transmit an indication towards a mobile entity involved in the data packet session indicating that a resource for the data packet session is currently unavailable will be available once the handover is completed, wherein said indication is separate from a handover command associated with the handover.

14. The first radio access node according to claim 13, wherein the data packet session comprises a real time data packet session provided for a mobile entity terminating or a mobile entity originating call.

15. The first radio access node according to claim 13, wherein the first radio access node is operative to transmit a handover request towards the second packet switched mobile communications network, the handover request comprising information about a reason for the handover.

16. The first radio access node according to claim 15, wherein the reason indicates at least one of:
   the handover is for a data packet flow with a quality of service suitable for a voice or video call; and
   the required quality of service or the needed resources could not be provided by the first packet switched mobile communications network.

17. The first radio access node according to claim 13, wherein the first radio access node is operative, for transmitting the indication, to transmit at least one of:
   a resource setup message comprising the indication towards the mobile entity requesting to set up radio resources for the data packet session; and
   an establishment accept message for a data packet session comprising the indication.

18. The first radio access node according to claim 13, wherein the first radio access node is operative to transmit the indication directly to the mobile entity or to transmit the indication via a core network entity of the first packet switched mobile communications network to the mobile entity.

19. The first radio access node according to claim 13, wherein the first packet switched mobile communications network comprises a 5G network and a second packet switched mobile communications network comprises a 4G network or wherein the first packet switched mobile communications network comprises a 4G network and the second packet switched mobile communications network is a 5G network.

20. A mobile entity comprising a memory and at least one processor, the memory containing instructions executable by said at least one processor, wherein the first mobile entity is operative to:
   connect to a first packet switched mobile communications network;
   determine that a data packet session requiring a defined quality of service should be started;
   receive an indication indicating that a resource for the data packet session is not available in the first packet switched mobile communications network, but will be available once a handover from the first packet switched mobile communications network to a second packet switched mobile communications network is completed, said indication being separate from a handover command associated with the handover; and
   set up the data packet session based on the indication with the assumption that the resource will be available when a handover from the first packet switched mobile communications network to the second packet switched mobile communications network is completed.

21. The mobile entity according to claim 20, wherein the mobile entity is operative to set a time out in response to receiving the indication, to check until the timeout occurs whether a handover command towards the second packet switched mobile communications network is received, and to perform the change of the radio access technology only when the handover command is received before the time out occurs.

22. The mobile entity according to claim 20, wherein the mobile entity is operative, for receiving the indication, to receive at least one of:
   a resource setup message requesting to set up radio resources for the data packet session; and
   an establishment accept message for a data packet session comprising the indication.

23. The mobile entity according to claim 20, wherein the mobile entity is operative to receive the indication from:
   a radio access node of the first packet switched mobile communications network; or
   a core network entity of the first packet switched mobile communications network independent from other indications sent by a radio access network of the first packet switched mobile communications network to the mobile entity.

24. The mobile entity according to claim 20, wherein the first packet switched mobile communications network comprises a 5G network and the second packet switched mobile communications network comprises a 4G network or wherein the first packet switched mobile communications network comprises a 4G network and the second packet switched mobile communications network comprises a 5G network.

25. A non-transitory computer readable medium storing a computer program product for controlling a first radio access node of a first packet switched mobile communications network, the computer program product comprising software instructions which, when run on at least one processor of the first radio access node, causes the first radio access node to execute the method of claim 1.

26. A non-transitory computer readable medium storing a computer program product for controlling a mobile entity, the computer program product comprising software instructions which, when run on at least one processor of the mobile entity, causes the mobile entity to execute the method of claim 8.

\* \* \* \* \*